(12) United States Patent
Allgaier et al.

(10) Patent No.: US 8,338,493 B2
(45) Date of Patent: Dec. 25, 2012

(54) METHOD FOR IMPROVING EFFICACY OF SURFACTANTS PREVENTION OF LAMELLAR MESOPHASES TEMPERATURE STABILIZATION OF THE SINGLE PHASE REGION AND A METHOD FOR REDUCING BOUNDARY SURFACE TENSION IN MICRO-EMULSIONS CONTAINING SILICONE OILS BY MEANS OF ADDITIVES AND SURFACTANT/OIL MIXTURES

(75) Inventors: Juergen Allgaier, Aachen (DE); Henrich Frielinghaus, Munich (DE); Christian Frank, Horrem (DE)

(73) Assignee: Forschungszentrum Juelich GmbH, Juelich (DE)

( * ) Notice: Subject to any disclaimer, the term of this patent is extended or adjusted under 35 U.S.C. 154(b) by 300 days.

(21) Appl. No.: 11/919,612

(22) PCT Filed: May 17, 2006

(86) PCT No.: PCT/DE2006/000842
§ 371 (c)(1),
(2), (4) Date: Jan. 10, 2008

(87) PCT Pub. No.: WO2006/122530
PCT Pub. Date: Nov. 23, 2006

(65) Prior Publication Data
US 2008/0292569 A1  Nov. 27, 2008

(30) Foreign Application Priority Data

May 19, 2005  (DE) .................. 10 2005 023 762

(51) Int. Cl.
*C08J 3/03*  (2006.01)
(52) U.S. Cl. ........................................... 516/76
(58) Field of Classification Search ............ 516/76
See application file for complete search history.

(56) References Cited

U.S. PATENT DOCUMENTS

| | | | |
|---|---|---|---|
| 5,017,297 A | 5/1991 | Spyropoulos et al. | |
| 5,518,716 A | 5/1996 | Riccio et al. | |
| 5,661,215 A | 8/1997 | Gee et al. | |
| 5,684,085 A | 11/1997 | Gee et al. | |
| 5,705,562 A | 1/1998 | Hill | |
| 5,707,613 A | 1/1998 | Hill | |
| 5,891,954 A | 4/1999 | Gee et al. | |
| 6,013,683 A | 1/2000 | Hill et al. | |
| 6,071,975 A | 6/2000 | Halloran | |
| 6,077,422 A | 6/2000 | Ryles | |
| 6,201,091 B1 | 3/2001 | Halloran et al. | |
| 6,207,781 B1 | 3/2001 | Halloran et al. | |
| 6,479,583 B2 | 11/2002 | Halloran et al. | |
| 6,616,934 B1 * | 9/2003 | Hill et al. ................. | 424/401 |
| 6,677,293 B1 * | 1/2004 | Allgaier et al. ............ | 510/417 |
| 2002/0091193 A1 * | 7/2002 | Halloran et al. ............ | 524/588 |
| 2002/0177539 A1 * | 11/2002 | Kasturi et al. ............... | 510/235 |
| 2003/0040571 A1 | 2/2003 | Feng et al. | |
| 2004/0077776 A1 * | 4/2004 | Feng et al. .................. | 524/588 |
| 2004/0147647 A1 * | 7/2004 | Hamachi ...................... | 524/157 |

FOREIGN PATENT DOCUMENTS

| | | |
|---|---|---|
| DE | 198 39 054 | 3/2000 |
| DE | 100 48 429 | 4/2002 |
| EP | 0 789 610 | 8/1997 |
| EP | 1 221 455 | 7/2002 |
| JP | 2002-525392 | 8/2002 |
| WO | WO-00/12660 | 3/2000 |
| WO | WO00/12660 * | 3/2000 |
| WO | WO-2004/035013 | 4/2004 |

OTHER PUBLICATIONS

Mork, S.W., Rose, G.D., Green, D.P. "High-Performance Poly(butylene oxide)/Poly(ethylene oxide) Block Copolymer Surfactants for the preparation of Water-in-Oil High Internal Phase Emulsions." Journal of Surfactants and Detergents, vol. 4, No. 2, p. 127-134, Apr. 2001.*
Handbook of Applied Surface and Colloid Chemistry, 2002.*
Handbook of Applied Surface and Colloid Chemistry, 2001.*
Nace, V.M., JAOCS, vol. 73, No. 1, p. 1, 1996.*

* cited by examiner

*Primary Examiner* — Kelechi Egwim
(74) *Attorney, Agent, or Firm* — Jordan and Hamburg LLP

(57) ABSTRACT

Disclosed is a method for improving efficacy of surfactants, prevention of lamellar mesophases, temperature stabilization of the single phase region and a method for reducing boundary surface tension in micro-emulsions containing silicone oils by means of additives and a surfactant/oil mixture. The above effects are achieved, whereby an additive of a block copolymer with a water-soluble block A and a block B which is either a polyalkylene oxide with at least 4 C atoms in the monomer component or a polydiene or a partially or completely hydrogenated polydiene or polyalkane, is added to the micro-emulsion.

35 Claims, 9 Drawing Sheets

METHOD FOR IMPROVING EFFICACY OF SURFACTANTS PREVENTION OF LAMELLAR MESOPHASES TEMPERATURE STABILIZATION OF THE SINGLE PHASE REGION AND A METHOD FOR REDUCING BOUNDARY SURFACE TENSION IN MICRO-EMULSIONS CONTAINING SILICONE OILS BY MEANS OF ADDITIVES AND SURFACTANT/OIL MIXTURES

Method for increasing the efficiency of surfactants, suppressing lamellar mesophases, temperature stabilization of the monophase area, and method for reducing the interfacial surface tension in microemulsions that contain silicone oils, by means of additives and surfactant/oil mixture This application is a Section 371 Application of PCT/DE2006/000842 filed May 17, 2006.

The invention relates to a method for increasing the efficiency of surfactants, suppressing lamellar mesophases, temperature stabilization of the monophase, and method for reducing the interfacial surface tension in microemulsions that contain silicone oils, by means of additives and a surfactant/oil mixture.

In the following, microemulsions are construed as mixtures of water, oil, and surfactant that are thermodynamically stable. An oil is construed to be a liquid that is not miscible with water.

Normally hydrocarbon oils are used for oils in microemulsions. However, microemulsions with other oils such as ester oils are known. Microemulsions that contain silicone oils represent a special case. Such microemulsions are known in the prior art. Surfactants whose hydrophobic component is a silicon-containing organic residue, e.g. an oligodimethylsiloxane, are particularly suitable for these silicone oil microemulsions. The microemulsions can be liquids or solid gels. The following publications can be cited as examples: U.S. Pat. Nos. 5,705,562, 5,707,613; U.S. Pat. No. 5,707,613; EP 0 789 610 A1; and U.S. Pat. No. 6,616,934.

BACKGROUND OF THE INVENTION

The disadvantage of these silicone oil microemulsions lies in the high price for the required silicone oil surfactants.

Alternatively, mixtures of silicone surfactants and conventional surfactants that do not contain silicon can be used (US 2003/0040571 A1).

Also known are silicone oil microemulsions that do not use silicon-containing surfactants. In this case, the usual non-ionic or ionic surfactants or mixtures thereof are used (U.S. Pat. No. 6,013,683; U.S. Pat. No. 6,071,975). The disadvantage with these systems is that very high proportions of surfactants are required to maintain microemulsions.

It is also possible to use for the oil functional silicones that contain e.g. vinyl groups, Si—H, amino groups, Si—OH. The microemulsions can also be used as reaction media (EP 1 221 455 A1; U.S. Pat. No. 5,518,716; U.S. Pat. No. 5,661,215; U.S. Pat. No. 5,684,085; U.S. Pat. No. 6,207,781 B1; U.S. Pat. No. 6,201,091 B1; U.S. Pat. No. 5,017,297; U.S. Pat. No. 5,891,954).

The efficiency of the surfactants is expressed in the amount of a surfactant that is needed to mix a certain portion of oil in water or vice versa in the form of a microemulsion. Increasing efficiency thus also means widening the temperature window in which the microemulsion is stable.

However, undesired lamellar mesophases frequently occur in the technical formulation of microemulsions. Lamellar mesophases cause optical anisotropy and increased viscosity.

Temperature behavior represents another problem in the technical formulation of microemulsions. In particular, adding an additive generally leads to a shift of the monophase areas that are important for the technical application to other temperature ranges. These shifts can be on the order of magnitude of 10° C. or more. However, the consequence of this is that e.g. formulas must be altered in order to adapt them to the new temperature behavior that prevails in the monophase area.

In addition there is the need to achieve a formulation that is at least equally good while saving on surfactants. In addition to costs, saving on surfactants is also advantageous for ecological and health reasons. These requirements are particularly pronounced for silicone oil microemulsions because the silicone surfactants used in this case are expensive or very high concentrations of the conventional surfactants have to be used.

German patent application 198 39 054.8-41 discloses a method for increasing the efficiency of surfactants while simultaneously suppressing lamellar mesophases, a method for stabilizing the temperature behavior of the temperature of the monophase area for oil, water, and surfactant mixtures, a method for enlarging the structure size of emulsified liquid particles in microemulsions, and a method for reducing the interfacial surface tension of oil/water mixtures in which AB block copolymers having a water-soluble block A and a water-insoluble block B are added.

SUMMARY OF THE INVENTION

It is therefore the object of the invention also to increase the efficiency of surfactants in microemulsions that contain silicone oils and to reduce the interfacial surface tension. Silicone oil-containing microemulsions are to be stabilized with smaller amounts of surfactant, i.e. there is to be savings on surfactants, and the temperature window of the thermodynamic stability is to be widened. Moreover, the occurrence of lamellar phases in silicone oil-containing microemulsions is to be suppressed and the interfacial surface tension is to be reduced. The temperature behavior of silicone oil-containing microemulsions should remain unaffected by additives, that is, the position of the monophase area in the phase diagram should be largely unaffected by the addition of additives in terms of the temperature.

In addition, an additive is to be provided that effects the aforesaid advantages and e.g. that can be added to a microemulsion without it being necessary to significantly modify the formula. Moreover, an additive is to be provided that can be used in detergents and/or in silicone oil-containing microemulsions and that effects a reduction in the amount of surfactant required for efficacy. Among these are hair-care and personal hygiene products and cosmetic products such as deodorants, skin care products, sunscreens, lotions, shampoos, shower gels, bath preparations, lubricants, slip agents, release agents, plant protection products, pharmaceuticals, textile care products, leather and fur care products, automobile care products, cleaners and polishes, and products for household, commercial, and industrial applications. It should also provide an opportunity to produce microemulsions the size of which corresponds to the emulsified liquid particles in emulsions. The temperature window for the microemulsion stability should be enlarged for the same surfactant content if silicone oils are added.

Surprisingly, all of the objects are inventively attained in that a block copolymer having a water-soluble block A and a block B that is either a polyalkylene oxide having at least 4 C atoms in the monomer component or a polydiene, a partially or completely hydrogenated polydiene having very small content of 1,4 microstructure or a high content of short-chain branching is used as an additive.

Block A is preferably not soluble in silicone oil and Block B is preferably not soluble in water.

Block A preferably comprises PEO, but copolymers made of ethylene oxide with higher alkylene oxides such as for instance propylene oxide and/or butylene oxide are also possible without Block A losing its solubility in water.

However, all blocks A can be used that are water-soluble so that they form an amphiphile in conjunction with block B. Moreover, examples for block A can be polyacrylic acid, polymethacrylic acid, polystyrene sulfonic acid and their alkali metal salts in which there has been at least a partial substitution of the acid function by alkali metal cations, polyvinylpyridine and polyvinyl alcohol, polymethylvinyl ether, polyvinylpyrrolidine, polysaccharides, and mixtures thereof.

The monomer components can occur in any sequence within block A. The individual components preferably alternate at least in part.

In one further preferred embodiment the monomer components of block A have a stochastic sequence.

Block A should preferably not be soluble in silicone oil.

In contrast, block B is preferably a polyalkylene oxide having at least 4 carbon atoms in the monomer component, preferably polybutylene oxide, polypentylene oxide, and polyhexylene oxide, but also other polyalkylene oxides having at least four carbon atoms in the monomer component. 1,2 butylene oxide is particularly preferred for the monomer component.

A block B can comprise at least two components from the group of polybutylene oxide, polypentylene oxide, and polyhexylene oxide, but also other polyalkylene oxides having at least four carbon atoms in the monomer component.

Block B can also include ethylene oxide and propylene oxide if there is solubility in silicon oil.

Moreover, Block B should preferably not be soluble in water.

Furthermore, triblocks with the structure ABA or BAB can be used as well as star-shaped polymers with the structure $(AB)_n$ or $(BA)_n$, n symbolizing the number of arms in the star polymer. In the case of polyalkylene oxide block copolymers, the center of the star structure can be for instance an n-functional alcohol where n=number of OH groups or an m-functional amine where m=number of amino groups and n=number of H atoms bonded to nitrogen. In the case of $(AB)_n$ the component A is connected to the center of the star and in the case of $(BA)_n$ the component B is connected to the center of the star.

Another embodiment of block B are polydienes having a very small portion of 1,4 microstructure or its partially hydrogenated or completely hydrogenated polyalkane variants. Possible monomers for block B are: 1,3 butadiene, isoprene, 1,3 pentadiene, 2,3-dimethyl-1,3-butadiene, 1,3-hexadiene, and myrcene. Mixtures of the corresponding diene monomers are also possible in the block B. The number of C atoms in 1,3 diene monomers is between 4 and 20, preferably 4 and 10, particularly preferred 4 or 5. Butadiene and isoprene are particularly preferred. The diene is preferably anionically polymerizable. The branching in the polyalkanes can be attributed to the branching in the polydiene. However, the short-chain branched polyalkane blocks can also be produced without hydrogenating polydienes from other monomers as dienes, e.g. poly(1,2-butene) from 1-butene.

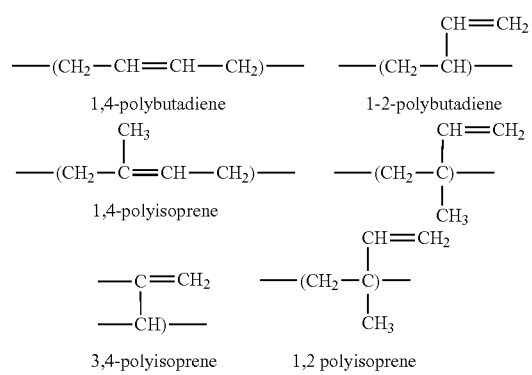

1,4-polybutadiene    1-2-polybutadiene 1,4-polyisoprene 3,4-polyisoprene    1,2 polyisoprene The microstructure of the polymer block B should be such that the 1,4 content is as small as possible. Ideally it should not exceed 10%. Other preferred ranges that lead to good results also extend however to a 1,4 content of 25% or, less preferred, 50%. Block B can be partially or completely hydrogenated.

The polymers obtained in this manner are inter alia poly (1-butene) (from 1,2 polybutadiene) or poly(1-hexene) (from 1,2 poly(1,3-hexadiene)).

The stereochemical structure of the hydrogenated variants should be as atactic as possible.

The same structures as for the polyalkylene oxide block copolymers are possible.

Surprisingly, it has been found that the inventive AB block copolymers are created such that their block B is soluble in silicone oils.

Advantageous further developments of the invention are provided in the subordinate claims.

Blocks A and B can have molecular weights between 500 and 100,000, preferably between 1000 g/mol and 50,000 g/mol, and particularly preferably between 3000 g/mol and 20,000 g/mol.

A polyethylene oxide block is preferably used for block A. Moreover, a copolymer of ethylene oxide and propylene oxide that is soluble in water can be used for block A.

A polyalkylene oxide block having at least 4 C atoms in the monomer component is preferably used for block B. These blocks B have the advantage that they are better producible and better miscible with the surfactants than polymers having blocks B=polydiene, partially/completely hydrogenated polydiene.

The inventively used AB block copolymers having block B=polyalkylene oxide can preferably be obtained from an alkoxylation using sequential polymerization of the blocks.

Block B is advantageously soluble in mineral oils or silicone oils.

Particularly advantageous properties of the inventively used AB block copolymers are observed in application products when the molecular weights of blocks A and B are on the order of magnitude of 3000-20,000 g/mol for blocks A and B. Thus the polymers having these relatively low molecular weights dissolve rapidly and well, i.e. the polymers are easy to work into a surfactant.

In one preferred embodiment, block A has ½ to 2-times the molecular weight of block B.

In the inventively used AB block copolymers, the two blocks A and B should have the greatest possible difference in their polarity. Block A is as polar as possible and Block B is as non-polar as possible. This increases the amphiphilic behavior.

Block A is water-soluble and block B is preferably soluble in non-polar media.

Block B is advantageously soluble in mineral oils, high-boiling esters, or aliphatic hydrocarbons or in silicone oils. This also preferably applies at room temperature.

Moreover, the AB triblock copolymers having the ABA or the BAB pattern and the star-shaped polymers of this monomer sequence have the same inventive effect and are therefore included in the invention.

Moreover, star-shaped polymers with the structure $(AB)_n$ or $(BA)_n$ are also included in the invention, n symbolizing the number of arms in the star polymer. In the case of polyalkylene oxide block copolymers, the center of the star structure can be for instance an n-functional alcohol where n=number of OH groups or an m-functional amine where n=number of H atoms bonded to nitrogen. These star-shaped polymers also have the inventive effect.

As an example, but not a limitation, the following surfactants (C) and their mixtures can be used with the inventive additives:

Non-ionic surfactants of the alkyl alkoxylate class, especially alkyl alkoxylates having a narrow molecular weight distribution and/or a low residual alcohol content.

Non-ionic surfactants of the alkyl polyglucoside (APG, "sugar surfactants", $C_iG_j$ where $i \geq 8$) class having cosurfactant alcohol ($C_x$—OH, $x \geq 6$)

Silicone Polyether Surfactants

Anionic surfactants, e.g. fatty alcohol sulfates, alkylbenzene sulfonates, alkylether sulfates, AOT (sodium bis-(2-ethylhexyl)sulfosuccinate)

Cationic Surfactants

Mixtures of surfactants, in particular non-ionic/anionic or non-ionic/cationic or silicone surfactant having non-silicon-containing surfactant.

In accordance with the invention, the efficiency of surfactants can now also be increased in microemulsions that contain silicone oils.

As an example, but not a limitation, the invention can be applied to microemulsions that contain silicone oils of the following structure types: linear, cyclic, and branched siloxanes.

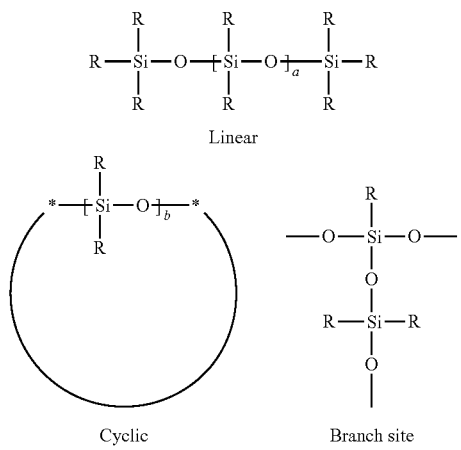

Linear

Cyclic

Branch site

Where:

R=organic group, preferably an aliphatic or aromatic hydrocarbon group, particularly preferred $CH_3$.

Other organic groups that have for instance functional groups are also possible for R, such as: OH groups, amino groups, epoxy groups.

There can also be a plurality of different groups R.

Some of the R groups can also be —H or —OH.

a can preferably be 0-1000.

b can particularly preferred be between 3 and 10, a and b being distribution-related means. In particular a=0-10 and b=3-6.

The following compounds are cited as examples of silicone oils:

$R=CH_3$, a=0 hexamethyldisiloxane ($M_2$)
$R=CH_3$, a=1 octamethyltrisiloxane (MDM)
$R=CH_3$, a=2 decamethyltetrasiloxane ($MD_2M$)
$R=CH_3$, b=3 hexamethylcyclotrisiloxane ($D_3$)
$R=CH_3$, b=4 octamethylcyclotetrasiloxane ($D_4$)
$R=CH_3$, b=5 decamethylcyclopentasiloxane ($D_5$)

The silicone oils are generally industrial products that are not monodisperse in their compositions.

Mixtures having different values for a and b are also possible, as are mixtures of linear and/or cyclic and/or branched silicone oils.

The aqueous phase of the microemulsion can contain additives like salts or water-soluble organic compounds such as e.g. glycols.

The oil phase can also contain adjuvants. However, the additives and adjuvants should not destroy the microemulsion.

For instance, glycerin can be added to the water in order to match the refractive index of the aqueous component to that of the oil component. Because of this microemulsions with increased efficiency that are visually turbid become transparent again. This method is particularly important for microemulsions that are used in the fields of cosmetic products, hair care, and personal hygiene products.

The inventive microemulsions do not absolutely have to be liquid. They can also include gel-like solid mixtures provided these are microemulsions in the thermodynamic sense. The solid form can therefore be obtained, e.g. by adding additives to the aqueous and/or oily component or by mesophases present in the microemulsion.

The ratio of the weight of the aqueous phase to the oil phase is for instance 0.01-100, preferably 0.1-10, particularly preferred 0.3-3.

The block copolymer weight proportion in the surfactant block copolymer mixture is for instance preferably 0.01-0.25, particularly preferred 0.05-0.15.

The surfactant/block copolymer mixture weight proportion in the microemulsion is preferably 0.03-0.3, preferably 0.05-0.2, depending on the temperature window.

In accordance with the invention, by adding the inventive AB block copolymers to the water/oil/surfactant mixture, the position of the monophase area remains in the same temperature range in the phase diagram, the efficiency of the surfactant mixture is significantly increased, lamellar mesophases are controlled in microemulsions, and the interfacial surface tension is reduced. In addition, microemulsions retain the properties characteristic of them while enlarging their structure; thus the emulsified structures can be up to approx. 2000 Angstroms. The size of the emulsified liquid particles is largely a function of the surfactant concentration.

A few terms shall be defined in the following:

C=Any surfactant or emulsifier, such as anionic, cationic, non-ionic surfactant or sugar surfactant, or mixtures thereof that contain at least two surfactants.

D=Additive that is inventively added to the surfactant C.

γ=Total surfactant concentration (weight fraction) of C and D where $$\gamma = \frac{m(C) + m(D)}{m_{ges}}$$

In the formula above,
m=weight in g
γ=dimensionless weight fraction
$m_{ges}$=total weight from $m_{water}$+$m_{oil}$+m(C)+m(D)
γ=total surfactant concentration at point of intersection at which the monophase area meets the three-phase area in the phase diagram. This is equal to the total minimum surfactant concentration that is required at a given water/oil ratio to completely mix the water and oil.
δ=Mass fraction of the additive D in the surfactant C+additive D mixture,
equals $$\delta = \frac{m(D)}{m(C) + m(D)}$$

where
m=weight in g and
δ=weight fraction (dimensionless)
1,2 PB6: Polybutadiene
PIH13: Hydrogenated polyisoprene
PEP5: Hydrogenated polyisoprene
PB05 and PB010: Poly(1,2-butylene oxide)
PEO: Polyethylene oxide The associated microstructures for the non-polar blocks 1,2PB6, PIH13, PEP5 are provided in Table 1, the values for the hydrogenated variants, PIH13 and PEP5, being related to the non-hydrogenated polyene variants.

The efficiency of the surfactants is expressed in the amount of surfactant that is needed to solubilize a certain portion of oil in water or vice versa. The smaller the amount of surfactant needed for the same effectiveness, the higher the efficiency is. There has also been an increase in efficiency when the microemulsion is stabilized at the same surfactant concentration across wider temperature ranges.

Microemulsions are produced without adding a large amount of energy. The components can fundamentally be added to one another in any sequence.

The block copolymer and the surfactant do not have to be considered as a unit, but it can make sense to add them to a formulation together.

The following surfactants were used for the examples: Pentaethylene glycol monododecyl ether ($C_{12}E_5$), triethylene glycol monododecyl ether ($C_{12}E_3$), didodecylammonium bromide (DDAB), hydroxy(polyethyleneoxy)propyl-terminated polydimethyl siloxane [with] molecular weight 550-650 g/mol: 50% ($CH_2$—$CH_2$—O) (Gelest Inc. Morrisville, Pa., USA) ($C_4D_3E_8$). Silicone polyether surfactants that contain a heptamethyltrisiloxane group for the hydrophobic unit, whereby a hydroxyl(polyethyleneoxy)propyl group is attached to the center silicon atom.

For M(DE10.3)M, mean ethoxylation of 10.3 and for M(DE9.7)M mean ethoxylation of 9.7 were found by means of NMR spectroscopy.

The behavior of the inventive microemulsions is depicted in FIGS. 1-9:

In these diagrams, the curves are each drawn in at a δ value that characterizes the limit of the monophase area associated with a δ value. The peak of each curve is the point at which different multiphase areas meet. This point is also called the fishtail point. The farther the peak of a curve is at low surfactant concentrations, i.e. γ values, the greater the efficiency of the surfactant C is by adding the block copolymer D.

The label 1 characterizes the areas of monophase microemulsion, 2 describes an oil in water microemulsion coexisting with an oil phase, and $\overline{2}$ is a water in an oil microemulsion coexisting with an aqueous phase. Lamellar phases are identified in the figures with $L_\alpha$. If this is not present, there is no lamellar phase in the area being examined.

Table 1 characterizes the block copolymers from the examples.

Table 2 provides the measured values from the characterization of the microemulsions by means of small-angle neutron scattering.

Table 2 provides the weights for the polymer content δ and for the surfactant content γ near the fishtail point. The position of the maximum scatter intensity $q_{max}$ largely characterizes the domain size $d_{TS}$—$2\pi/q_{max}$, but a more refined evaluation of the scattered intensity is based on the Teubner-Strey formula, and a more precise value is found for $d_{TS}$ and in addition a correlation length ξ that is approximately half the value of $d_{TS}$.

The T/γ diagrams depicted in FIGS. 1-8 refer to systems with a constant 1:1 water/oil volume ratio and shall be explained in the following.

Figure 1:
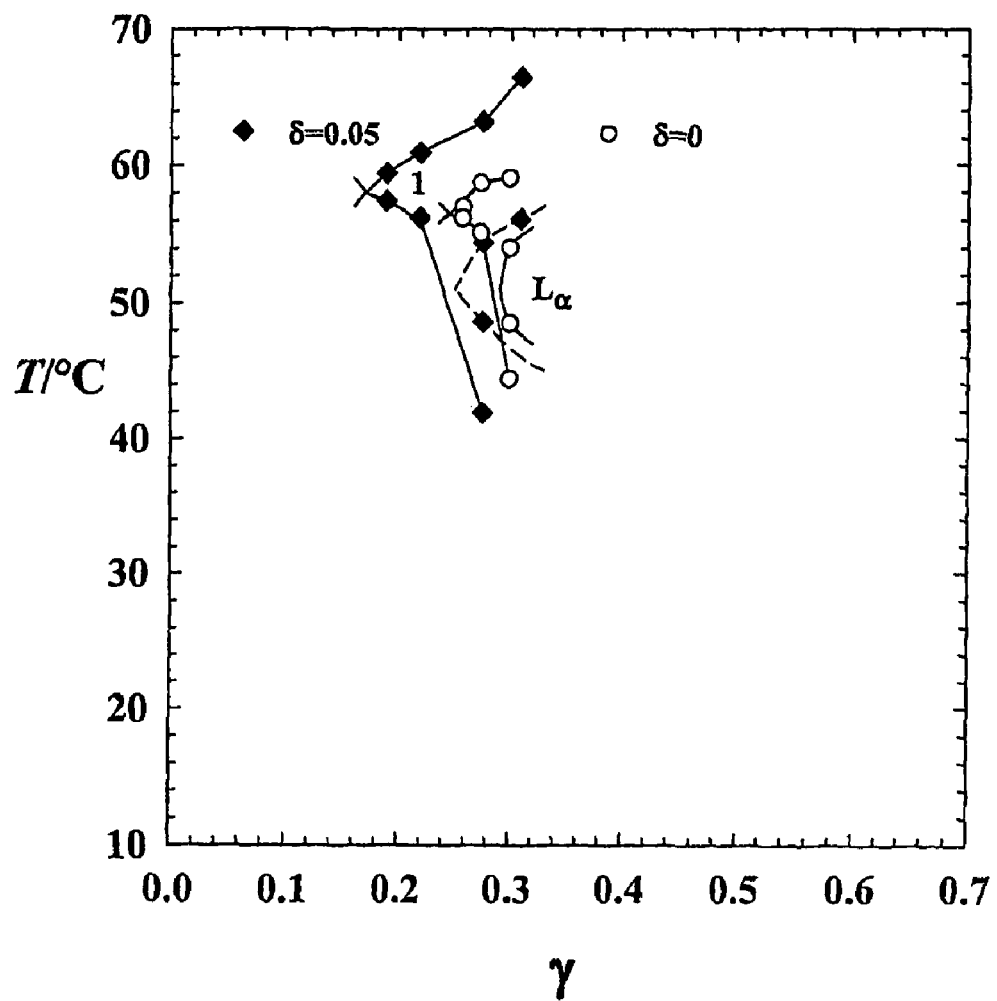
FIG. 1: Temperature/surfactant concentration diagram for the water/$M_2$/$C_{12}E_5$-1,2-PB6-PEO6 mixture as a function of the addition of 1,2-PB6-PEO6 (δ) at a constant water/oil ratio of φ=0.5.

FIG. 1 illustrates how the efficiency of the total surfactant increases with the addition of the block copolymer 1,2-PB6-PEO6. If a microemulsion is formulated from equal parts water and $M_2$ (hexamethyldisiloxane) and $C_{12}E_5$, at a surfactant concentration of 23% (γ=0.23) between 0° C. and 100° C. there are only two-phase and three-phase areas. If in the same mixture 5% of the surfactant $C_{12}E_5$ is replaced with the amphiphilic block copolymer 1,2-PB6-PEO6 (δ=0.05), a monophase area is obtained between 45° C. and 62° C. In addition there is only a very minor shift in the phase limit on the temperature axis at the fishtail point. This means that the block copolymer D leaves the position of the efficacy of the surfactant C essentially invariant with respect to its application temperature. Both systems shown contain a lamellar phase, the extension of which still decreases with respect to the fishtail point when using the amphiphilic block copolymers.

Figure 2:
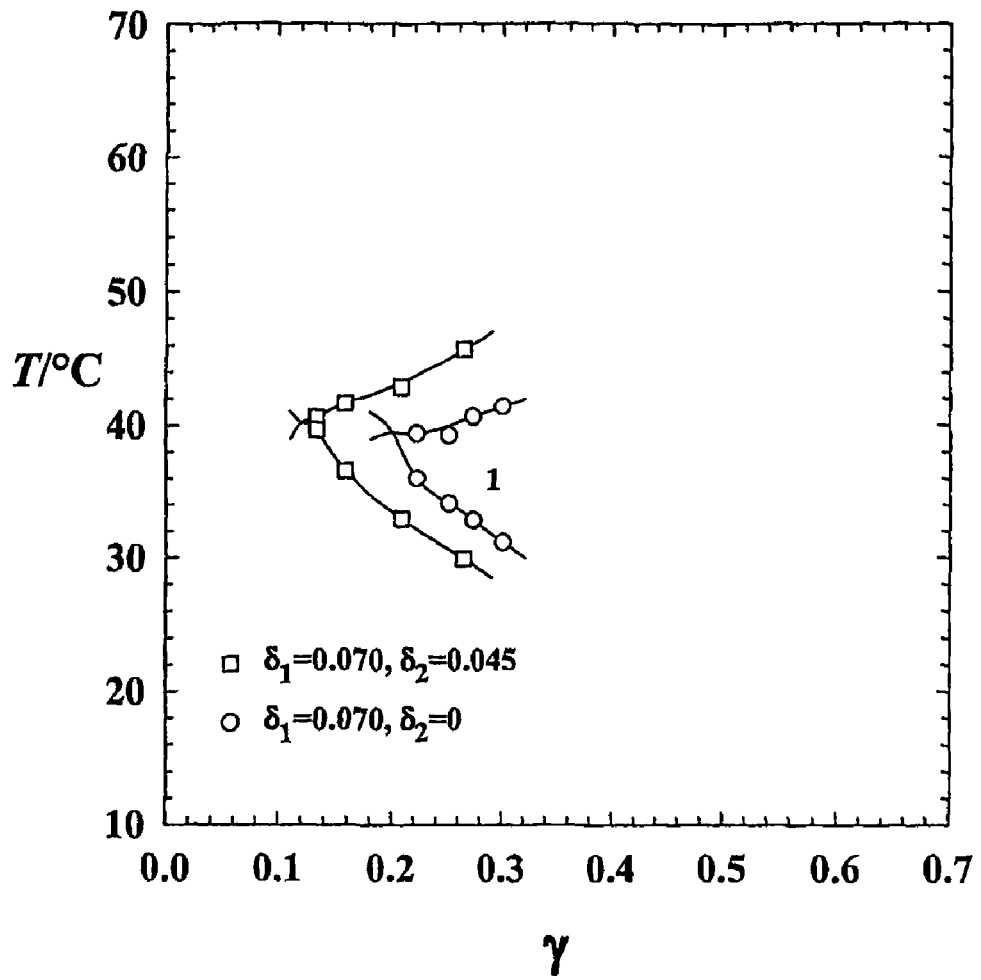
FIG. 2: Temperature/surfactant concentration diagram for the water/$D_4$-DDAB-$C_{12}E_3$-1,2-PB6-PEO6 mixture as a function of the addition of 1,2-PB6-PEO6 $\delta_2$ where [$\delta_2$=m(PBO5−PEO5)/(m(C12E3)+m(DDAB)+m(PBO5−PEO5))] and with a constant water/oil ratio of φ=0.5. The ratio $\delta_1$ [$\delta_1$=m(DDAB)/((m(C12E3)+m(DDAB)+m(PBO5−PEO5))] between ionic and non-ionic surfactants was therefore kept constant.

The efficiency of the total surfactant is also increased in the example illustrated in FIG. 2 of a system having a cationic surfactant DDAB and a non-ionic surfactant $C_{12}E_3$. In this case, the block copolymer can further increase the synergistic effects of the surfactant mixture. In addition, no mesophases occur in this system.

Figure 3:
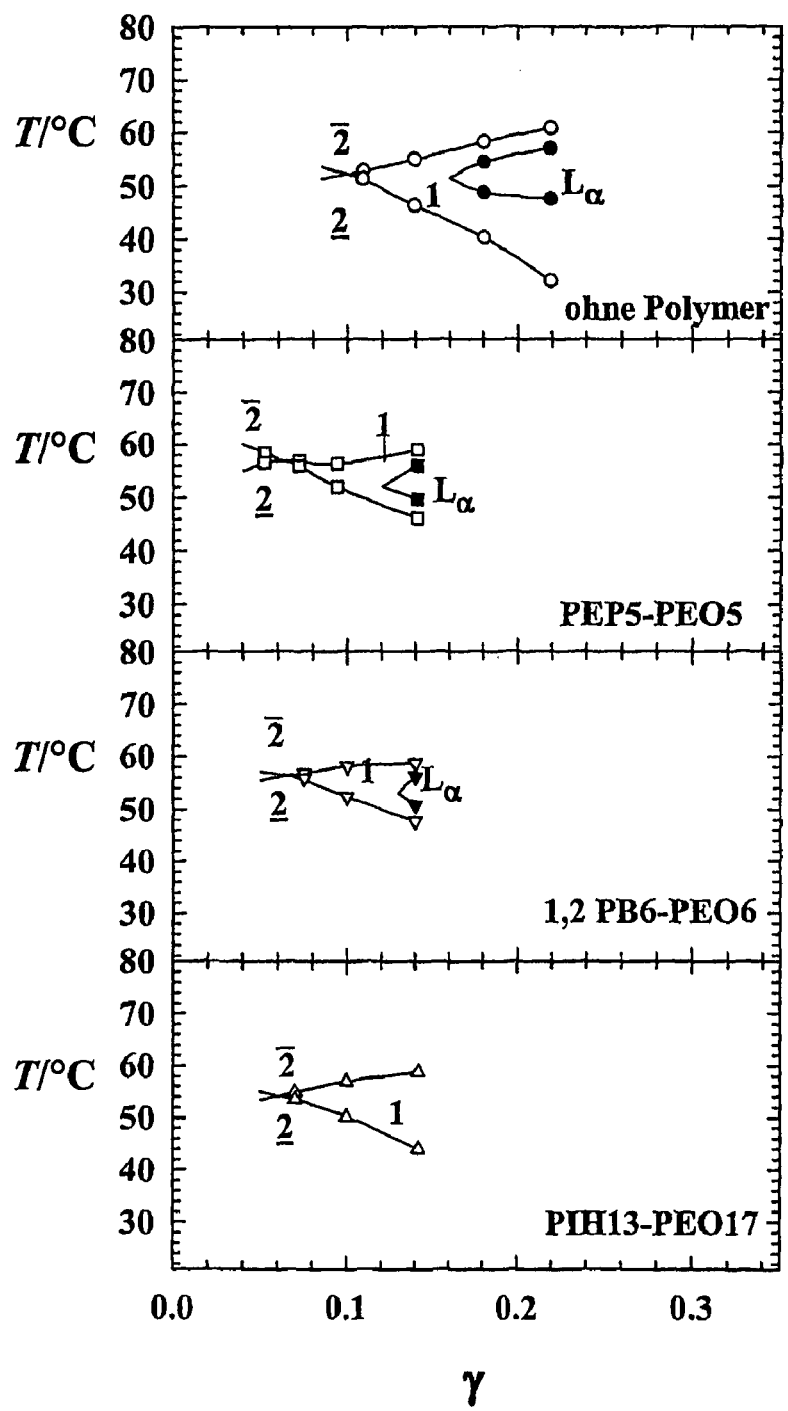
FIG. 3: Temperature/surfactant concentration diagram for the mixture water-$M_2$-M($DE_{10.3}$)M-amphiphilic polymer for the polymers PEP5-PEO5, 1,2-PB6-PEO6, PIH13-PEO17 at δ=0.05 and a constant water/oil ratio of φ=0.5. For comparison purposes the upper depiction provides the phase diagram of the system without additive (δ=0).

FIG. 3 depicts an overview of the efficiency and temperature position of various water-$M_2$-M(DE$_{10.3}$)M-amphiphilic polymer systems, whereby the polymers PEP5-PEO5, 1,2-PB6-PEO6, and PIH13-PEO17 were used at δ=0.05 and a constant water/oil ratio of φ=0.5. In all of the polymers used there is an increase in efficiency and a nearly unchanged temperature position compared to the initial system with δ=0. For the polymers PEP5-PEO5 and 1,2-PB6-PEO6, the lamellar phase diminishes slightly with regard to the fishtail point, although it would be expected that due to the higher efficiently the lamellar phase should edge closer to the fishtail point. There is no lamellar phase in the measurement range for PIH13-PEO17.

Figure 4:
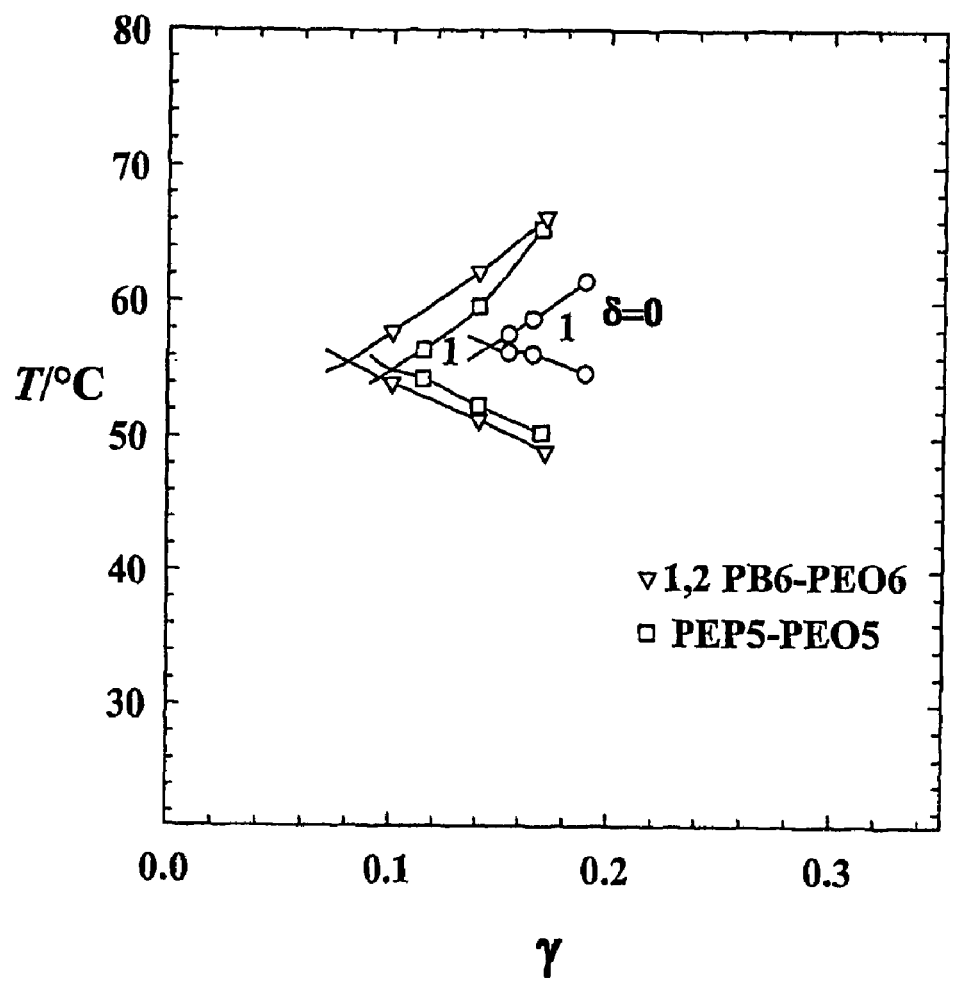
FIG. 4: Temperature/surfactant concentration diagram for the mixture water-MDM-$C_4D_3E_8$-amphiphilic polymer for the polymers PEP5-PEO5, 1,2-PB6-PE06 at δ=0.05 and a constant water/oil ratio of φ=0.5.

FIG. 4 depicts how the efficiency of the total surfactant increases with the addition of the block copolymers PEP5-PEO5 and 1,2-PB6-PEO6 in the mixture made of water-MDM-$C_4D_3E_8$-amphiphilic polymer at δ=0.05. A constant water/oil ratio of φ=0.5 was used in this example, as well. Compared to the polymer-free system with δ=0, both polymers demonstrate a pronounced increase in efficiency. Overall, however, it increases more for the polymer 1,2-PB6-PEO6, which is more soluble in the silicone oil. The same characteristics occur with respect to temperature behavior.

The water-insoluble block in the block copolymer PEP5-PEO5 has a lower portion of short chain branching and a high portion of 1,4 microstructure in the basic polydiene. While PEP5-PEO5 is suitable for increasing efficiency in the smallest dimethylsiloxane $M_2$, the increase in efficiency from PEP5-PEO5 in the next higher dimethylsiloxane MDM is much smaller than that of 1,2PB6-PEO6, however, which has only 9% of 1,4 microstructure in the hydrophobic block. PEP5-PEO5 does not attain any increase in efficiency for higher molecular weight siloxanes.

Figure 5:
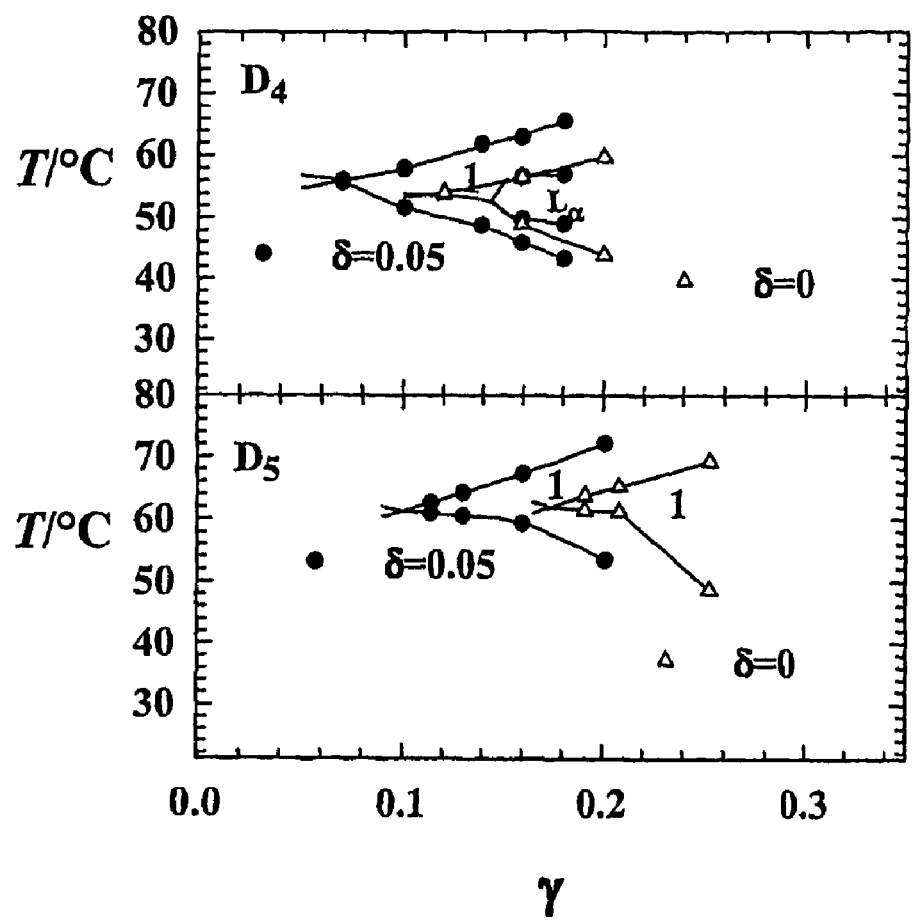
FIG. 5: Temperature/surfactant concentration diagram for the mixture water-cyclic silicone oil-M($DE_{9.7}$)M-1,2-PB6-PEO6 as a function of the addition of 1,2-PB6-PEO6 (δ) at a constant water/oil ratio of φ=0.5.

FIG. 5 illustrates an overview of the efficiency and temperature position of various water-cyclic silicone oil-M(DE$_{9.7}$)M-1,2-PB6-PEO6 systems, the silicone oils $D_4$ and $D_5$ being present in a constant water/oil ratio of φ=0.5. The polymer-free systems (δ=0) and systems with 5% polymer were each examined in the surfactant mixture. In both cases the efficiency is clearly increased by the polymer 1,2-PB6-PEO6; however, overall it precipitates out more heavily in the less efficient system containing $D_5$.

Figure 6:
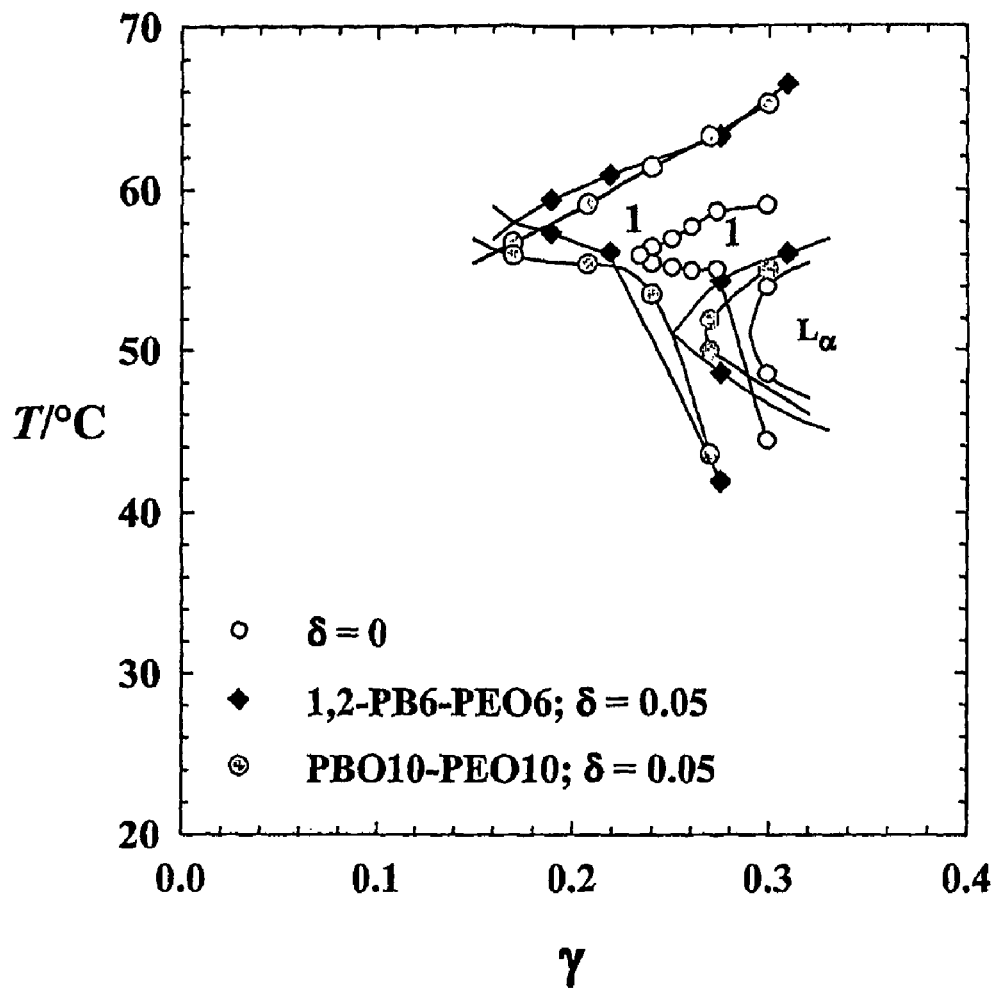
FIG. 6: Temperature/surfactant concentration diagram for the mixture water-$M_2$-$C_{12}E_5$-amphiphilic polymer for the polymers 1,2-PB6-PEO6 and PBO10-PEO10 at δ=0.05 and a constant water/oil ratio of φ=0.5. For comparison purposes the phase diagram is provided without additive (δ=0).

FIG. 6 illustrates how the efficiency of the total surfactant is increased by adding the block copolymers 1,2-PB6-PEO6 and PEO10-PBO10 in the mixture made of water-$M_2$-$C_{12}E_5$-amphiphilic polymer at δ=0.05. In this example, as well, a constant water/oil ratio of φ=0.5 was used. Both polymers exhibit a pronounced increase in efficiency compared to the polymer-free system with δ=0.

Lamellar phases can be detected in the microemulsion with polymers and in the microemulsion without polymers. Here, as well, it would be expected that the lamellar phases in efficient systems would come closer to the fishtail point than is the case.

Figure 7:
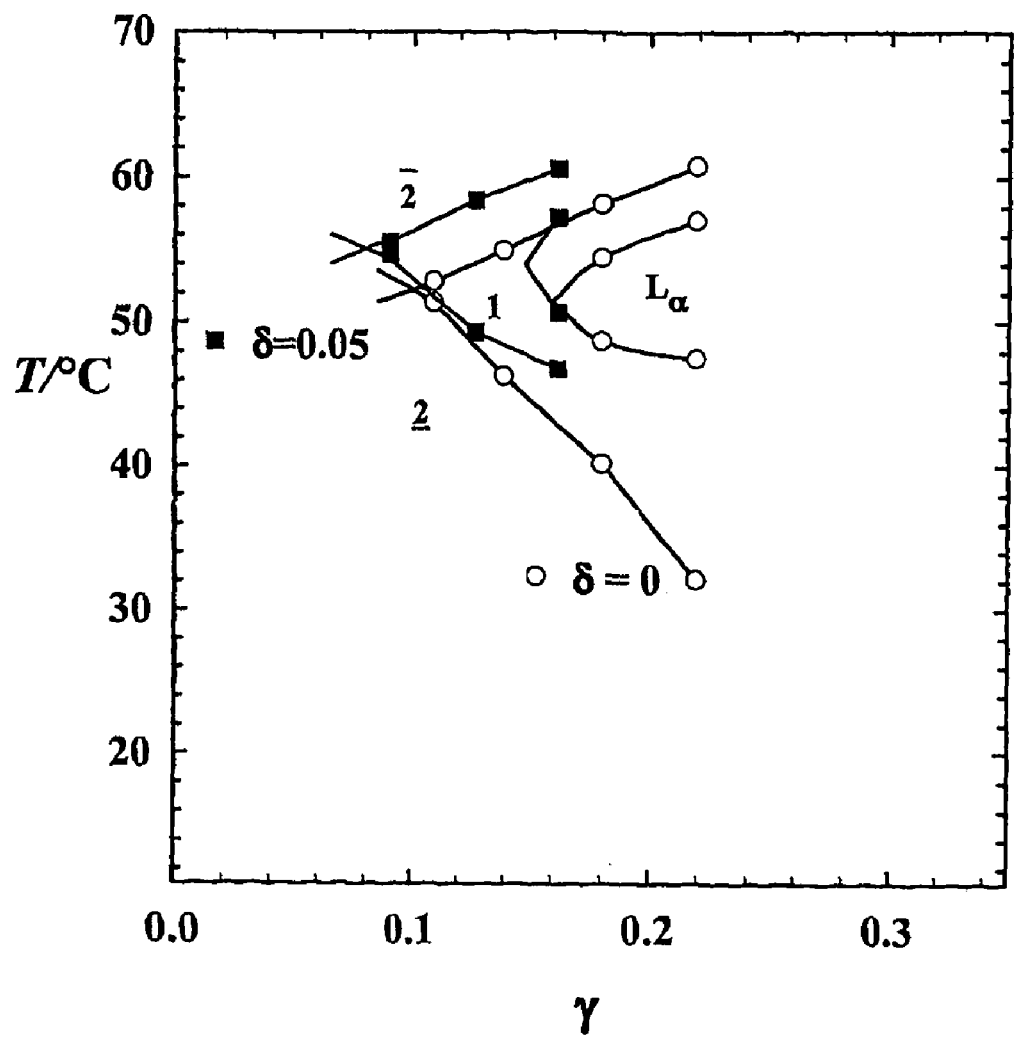
FIG. 7: Temperature/surfactant concentration diagram for the mixture water-$M_2$-M($DE_{10.3}$)M-PBO5-PEO5 at δ=0.05 and a constant water/oil ratio of φ=0.5. For comparison purposes the figure provides the phase diagram of the system with δ=0 without additive.

FIG. 7 illustrates how the efficiency of the total surfactant is increased by adding the block copolymer PBO5-PEO5 in the mixture made of water-$M_2$-M(DE$_{10.3}$)M at δ=0.05. A constant water/oil ratio of φ=0.5 was also used in this example. The position of the phase inversion temperature is shifted slightly to higher temperatures. Lamellar phases can be found in the microemulsion with polymers and without polymers. In this case, as well, it would be expected that the lamellar phases in efficient systems would come closer to the fishtail point than is the case.

Figure 8:
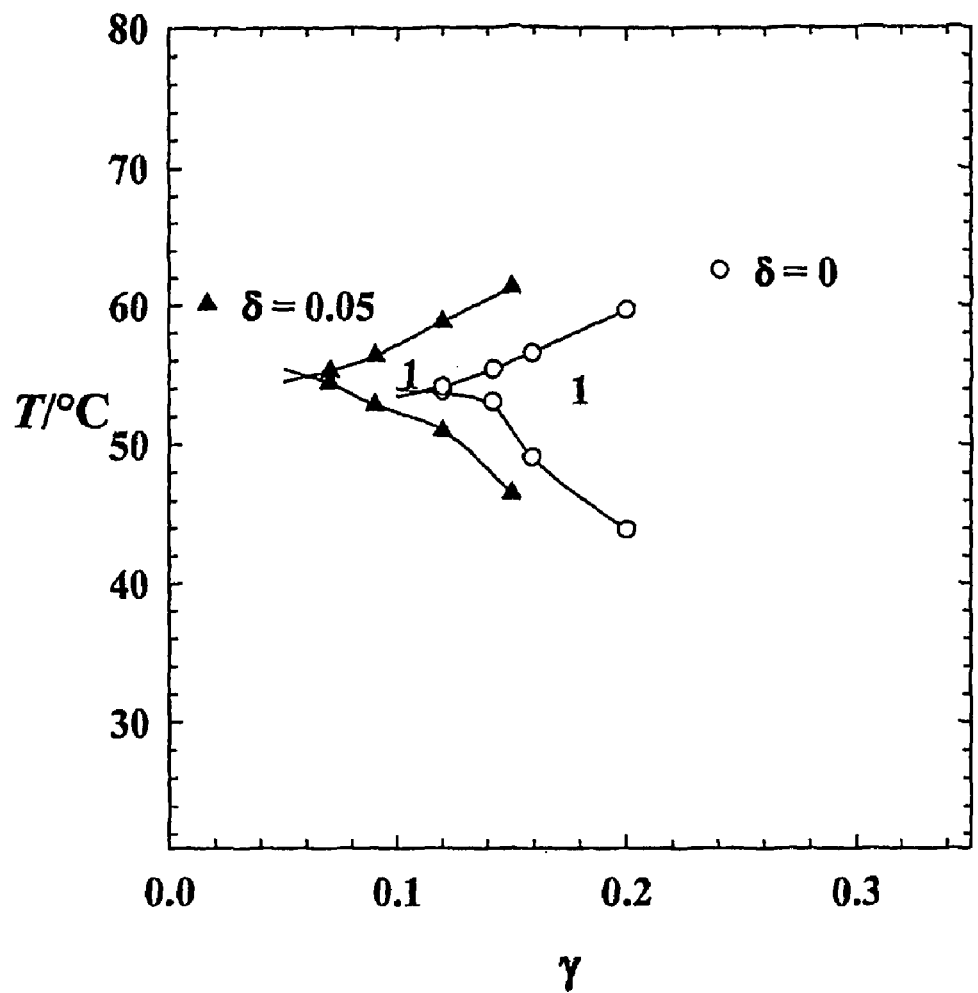
FIG. 8: Temperature/surfactant concentration diagram for the mixture water-$D_4$-M($DE_{9.7}$)M-PIH13-PE017 as a function of the addition of amphiphilic block copolymer (δ) at a constant water/oil ratio of φ=0.5.

FIG. 8 illustrates how the total amount of surfactant that is needed for forming the microemulsion is clearly reduced by the addition of the block copolymer PIH13-PEO17 in the mixture made of water-$D_4$-M(DE$_{9.7}$)M at δ=0.05. At a constant water/oil ratio of φ=0.5 the phase inversion temperature in this example remains nearly unchanged.

Figure 9:
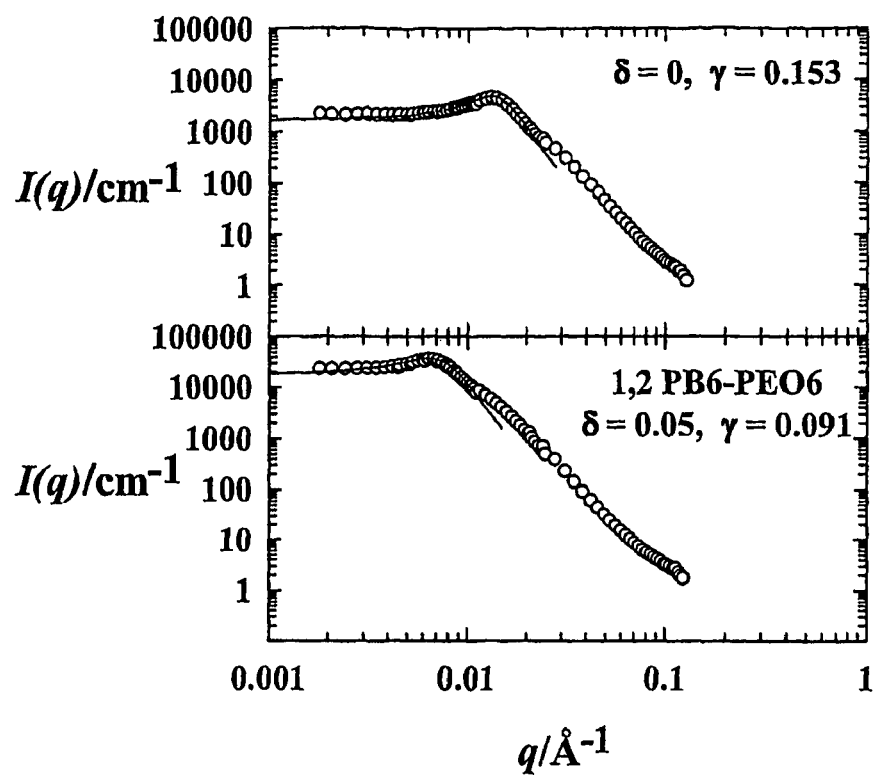
FIG. 9: Small-angle neutron scattering spectrum for the mixture water-MDM-$C_4D_3E_8$-amphiphilic polymer for the polymer PEO5, 1,2-PB6-PEO6 near the fishtail point ($\tilde{T},\tilde{\gamma}$) in the monophase area at δ=0 and δ=0.05.

FIG. 9 illustrates the macroscopic scatter cross-section I (proportional to the scatter intensity) as a function of the scatter vector Q for microemulsions without polymers and with polymers. However, the minimum possible surfactant concentration on the fishtail point was selected. The solid lines are adaptation curves according to the Teubner-Strey formula and provide a good description of the maximum intensity. The position of the maximum is inversely proportional to the domain size $d_{TS}$, and thus it is possible to see immediately the enlargement of the domains as an effect of the polymer. The maximum for the scatter intensity is frequently described with the Teubner-Strey formula (M. Teubner, R. Strey, J. Chem. Phys. 87 (1987) 3195). Precise values are obtained from this description for the domain size $d_{TS}$ and for a correlation length ξ which is about half the value of $d_{TS}$.

Table 2 and FIG. 9 illustrate that the size of the domains clearly increases in the system with the block copolymer. This means that larger amounts of water and oil can be mixed with a polymer with less surfactant in the system. Moreover, the scatter curves demonstrate a thermodynamically stable microstructure both in the system containing the polymer and in the polymer-free system.

The inventive reduction in the interfacial surface tension is illustrated in the example of the polymer PBO10-PEO10 in the system water-$M_2$-$C_{12}E_5$. Using the spinning drop tensiometer, at 56° C. an interfacial surface tension $\sigma_{ab}$ between water and silicone oil of $3.58*10^{-2}$ is obtained in the polymer-free system. If 5% of the surfactant is now replaced with PBO10-PEO10, the interfacial surface tension is reduced to $2.2*10^{-2}$ mNm. This reduction can be reproduced for all of the illustrated examples.

In the examples, a 5% polymer portion in the surfactant is equal to δ=0.05; however, other polymer contents can be used. The increase in efficiency is more pronounced in particular with high polymer contents. δ is preferably between 0.01 and 0.25.

The interfacial surface tension of surfactants such as for instance anionic, cationic, and non-ionic surfactants, sugar surfactants, silicone surfactants, in particular industrial surfactant mixtures, is reduced with the inventively used AB block copolymers. The occurrence of lamellar mesophases is suppressed. The temperature behavior of the microemulsions remains unchanged, that is, the addition of the inventively used additive does not affect the position of the monophase area with respect to the temperature in the phase diagram. Therefore the formulas do not have to be changed in order to ensure that the position of the monophase area remains the same with respect to the temperature in the monophase diagram.

The inventive AB block copolymers, ABA, BAB, and the star-shaped block copolymers can preferably be used for stabilizing cosmetic products containing microemulsions. Moreover, they can preferably be used as lubricants in the field of textiles, in pharmaceuticals, or as release agents.

Among possible applications are hair and personal care products and cosmetic products such as deodorants, skin care products, sunscreens, lotions, shampoos, shower gels, bath preparations, lubricants, slip agents, release agents, plant protection products, pharmaceuticals, textile care products, leather and fur care products, automobile care products, cleaners and polishes, and products for household, commercial, and industrial applications. An opportunity is also provided to produce microemulsions, the sizes of which correspond to those of the emulsified liquid particles in emulsions. The temperature window for the stability of the microemulsions should be enlarged for the same surfactant content if silicone oils are added.

Microemulsions can also be used as reaction media, they can absorb hydrophobic impurities or form by absorbing hydrophobic impurities, for instance when used as washing agents or detergents. The inventive microemulsions can give off hydrophobic components and/or wet solid or liquid surfaces. Silicone oils are suitable for this in particular due to their spreading action.

The silicone-oil containing microemulsions produced by means of the inventive addition of the AB block copolymers have emulsified liquid volumes that equal those of emulsions.

The increase in efficiency is also concurrently associated with an increase in the temperature interval within which the microemulsion is thermodynamically stable. This is particularly advantageous for industrial applications where stability must be assured across large temperature ranges.

TABLE 1

| | Non-polar block | | | | | Block copolymer | |
|---|---|---|---|---|---|---|---|
| | Mn | Mw/Mn | Microstructure | | | Mn | Mw/Mn |
| | | | 1,4 | 1,2 | 3,4 | | |
| 1,2 PB 6-PEO 6 | 4.660 | 1.03 | 9 | 91 | | 13.100 | 1.03 |
| PIH 13-PEO 17 | 12.300 | 1.03 | 10 | 19 | 71 | 21.700 | 1.03 |
| PEP 5-PEO 5 | 4.730 | 1.03 | 93 | | 7 | 10.500 | 1.03 |
| PBO 5-PEO 5 | 5.700 | 1.06 | | | | 12.300 | 1.07 |
| PBO 10-PEG 10 | 9.100 | 1.04 | | | | 19.600 | 1.04 |

TABLE 2

| Polymer | δ | γ | $q_{max}$/Å$^{-1}$ | ξ/Å | $d_{TS}$/Å |
|---|---|---|---|---|---|
| — | 0 | 0.153 | 0.0132 | 216.74 | 449.39 |
| 1,2-PB6-PE06 | 0.05 | 0.091 | 0.0064 | 359.22 | 900.39 |

The invention claimed is:

1. A method for increasing the efficiency of a surfactant in a microemulsion including at least one silicone oil, comprising adding to the microemulsion, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein the molecular weight of blocks A and B are in the range of 1,000-50,000 g/mol.

2. A method for suppressing lamellar phases in a water/oil/surfactant mixture including at least one silicone oil, comprising adding to the mixture, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein the molecular weight of blocks A and B are in the range of 1,000-50,000 g/mol.

3. A method for stabilizing a temperature position of a monophase area for an oil/water/surfactant mixture including at least one silicone oil, comprising adding to the mixture, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein the molecular weight of blocks A and B are in the range of 1,000-50,000 g/mol.

4. A method for reducing an interfacial surface tension of an oil/water mixture including a surfactant and at least one silicone oil, comprising adding to the mixture, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein the molecular weight of blocks A and B are in the range of 1,000-50,000 g/mol.

5. A method for increasing the efficiency of a surfactant in a microemulsion including at least one silicone oil and water, comprising adding to the microemulsion, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein at a water to oil ratio of 1:1, the proportion of water to surfactant is between 1:1 and 3.7 on a weight/weight basis, and the proportion of oil to surfactant is between 1:1 and 3.7 on a weight/weight basis, wherein the molecular weight of blocks A and B are in the range of 1,000-50,000 g/mol.

6. The method in accordance with any one of claims 1 through 5, wherein block A is not soluble in an oil that contains silicone oil as at least one component.

7. The method in accordance with any one of claims 1 through 5, wherein block A comprises at least one component selected from the group consisting of monomers of ethylene oxide, propylene oxide, butylene oxide, higher alkylene oxides, polyacrylic acid, polymethacrylic acid, polystyrene sulfonic acid and their alkali metal salts in which there has been at least a partial substitution of an acid function by a member selected from the group consisting of alkali metal cations, polyvinylpyridine and polyvinyl and polyvinyl alcohol, polymethylvinyl ether, polyvinylpyrrolidine or polysaccharide.

8. The method in accordance with any one of claims 1 through 5, wherein a polyethylene oxide (PEO) is used as block A.

9. The method in accordance with any one of claims 1 through 5, wherein a block A is used in which monomer units occur in any sequence.

10. The method in accordance with any one of claims 1 through 5, wherein blocks A are used in which monomer units possess a stochastic sequence.

11. The method in accordance with any one of claims 1 through 5, wherein block B is soluble in oil containing silicone oil as at least one component.

12. The method in accordance with any one of claims 1 through 5, wherein said block copolymer is at least one component selected from the group consisting of compounds having the structure according to the pattern AB, ABA, BAB, $(AB)_n$-star and $(BA)_n$-star.

13. The method in accordance with any one of claims 1 through 5, wherein block B is soluble in pure silicone oils.

14. The method in accordance with any one of claims 1 through 5, wherein block A has a molecular weight between 3,000 and 20,000 g/mol.

15. The method in accordance with any one of claims 1 through 5, wherein block B has a molecular weight between 3,000 and 20,000 g/mol.

16. The method in accordance with any one of claims 1 through 5, wherein polydimethyl siloxane is used as said silicone oil.

17. The method of claim 16, wherein said silicone oil possesses a mean of no more than 10 dimethylsiloxane units.

18. A surfactant/oil mixture containing a silicone oil as at least one component, comprising, as an additive, a block copolymer having a water-soluble block A and a block B that is a polyalkylene oxide having a monomer component selected from butylene oxide, pentylene oxide, hexylene oxide and other alkylene oxides having at least 4 carbon atoms, wherein the molecular weight of blocks A and B are in the range of 1,000-50,000 g/mol.

19. The mixture of claim 18, wherein block A is not soluble in an oil that contains silicone oil as at least one component.

20. The mixture of claim 18, wherein block A comprises at least one component selected from the group consisting of monomers of ethylene oxide, propylene oxide, butylene oxide, higher alkylene oxides, polyacrylic acid, polymethacrylic acid, polystyrene sulfonic acid and their alkali metal salts in which there has been at least a partial substitution of an acid function by a member selected from the group consisting of alkali metal cations, polyvinylpyridine and polyvinyl alcohol, polymethylvinyl ether, polyvinylpyrrolidine or polysaccharide.

21. The mixture of claim 18, wherein a polyethylene oxide (PEO) is used as block A.

22. The mixture of claim 18, wherein a block A is used in which monomer units occur in any sequence.

23. The mixture of claim 18, wherein blocks A are used in which monomer units possess a stochastic sequence.

24. The mixture of claim 18, wherein block B is soluble in oil containing silicone oil as at least one component.

25. The mixture of claim 18, wherein said block copolymer is at least one component selected from the group consisting of compounds having the structure according to the pattern AB, ABA, BAB, $(AB)_n$-star and $(BA)_n$-star.

26. The mixture of claim 18, wherein block B is soluble in pure silicone oils.

27. The mixture of claim 18, wherein block A has a molecular weight between 3,000 and 20,000 g/mol.

28. The mixture of claim 18, wherein block B has a molecular weight between 3,000 and 20,000 g/mol.

29. The mixture of claim 18, wherein polydimethyl siloxane is used as said silicone oil.

30. The mixture of claim 29, wherein said silicone oil possesses a mean of no more than 10 dimethylsiloxane units.

31. The mixture of claim 18 wherein said mixture comprises a component of a microemulsion.

32. A composition selected from the group consisting of a hair care product, a personal hygiene product or a cosmetic product comprising the mixture of claim 18.

33. A composition selected from the group consisting of deodorants, skin care products, sunscreens, lotions, shampoos, shower gels, bath preparations, lubricants, slip agents, release agents, plant protection products, pharmaceuticals, textile care products, leather and fur care products, automobile care products, cleaners and polishes, or washing agents and detergents comprising the mixture of claim 18.

34. A method for increasing the efficiency of a surfactant in a microemulsion including at least one silicone oil, comprising adding to the microemulsion, as an additive, a block copolymer having a water-soluble block A and a block B comprising a polyalkylene oxide having a monomer component selected from butylene oxide, pentylene oxide, hexylene oxide, other alkylene oxides having at least 4 carbon atoms and combinations thereof, wherein the molecular weight of blocks A and B are in the range of 1,000-50,000 g/mol.

35. A surfactant/oil mixture containing a silicone oil as at least one component, comprising, as an additive, a block copolymer having a water-soluble block A and a block B comprising a polyalkylene oxide having a monomer component selected from butylene oxide, pentylene oxide, hexylene oxide, other alkylene oxides having at least 4 carbon atoms and combinations thereof, wherein the molecular weight of blocks A and B are in the range of 1,000-50,000 g/mol.

* * * * *